US010910891B2

(12) United States Patent
Hattori

(10) Patent No.: US 10,910,891 B2
(45) Date of Patent: Feb. 2, 2021

(54) ELECTRIC MOTOR HAVING CONDUCTORS OF DIFFERENT MATERIALS

(71) Applicant: TOYOTA JIDOSHA KABUSHIKI KAISHA, Toyota (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 16/444,308

(22) Filed: Jun. 18, 2019

(65) Prior Publication Data

US 2020/0044495 A1  Feb. 6, 2020

(30) Foreign Application Priority Data

Aug. 3, 2018 (JP) ................................ 2018-147151

(51) Int. Cl.
*H02K 1/14* (2006.01)
*H02K 21/16* (2006.01)
*H02K 15/02* (2006.01)
*H02K 3/52* (2006.01)

(52) U.S. Cl.
CPC ............. *H02K 1/148* (2013.01); *H02K 3/522* (2013.01); *H02K 15/026* (2013.01); *H02K 21/16* (2013.01)

(58) Field of Classification Search
CPC ...... H02K 1/148; H02K 3/522; H02K 15/026; H02K 15/0414; H02K 21/01

USPC .................................... 310/216.001, 216.063
See application file for complete search history.

(56) References Cited

U.S. PATENT DOCUMENTS

| 2006/0066167 | A1* | 3/2006 | Saito ....................... | H02K 3/12 310/201 |
| 2013/0200743 | A1* | 8/2013 | Okimitsu ................. | H02K 3/12 310/201 |
| 2018/0273016 | A1* | 9/2018 | Xu ........................... | B60K 6/10 |
| 2019/0267161 | A1* | 8/2019 | Arndt ....................... | H01B 1/023 |

FOREIGN PATENT DOCUMENTS

| JP | 2010-098832 A | 4/2010 |
| JP | 2010-183741 A | 8/2010 |

* cited by examiner

*Primary Examiner* — Tulsidas C Patel
*Assistant Examiner* — Rashad H Johnson
(74) *Attorney, Agent, or Firm* — Oliff PLC

(57) ABSTRACT

An electric motor includes: a rotary shaft member rotating about an axis; a rotor including a rotor core and a magnet, the rotor core being provided on the rotary shaft member, the magnet being provided on the rotor core; and a stator including a stator core and a stator coil, the stator core having a plurality of slots formed in a circumferential direction, the stator core being disposed at an interval in a radial direction that is a direction orthogonal to an axial direction of the rotary shaft member with respect to the rotor core, the stator coil being inserted into the plurality of slots and wound around the stator core. Further, the stator coil includes a first conductor and a second conductor having a conductivity greater than a conductivity of the first conductor, and the second conductor is disposed in the slots.

3 Claims, 5 Drawing Sheets

AXIAL DIRECTION

AXIAL DIRECTION

ELECTRIC MOTOR HAVING CONDUCTORS OF DIFFERENT MATERIALS

CROSS-REFERENCE TO RELATED APPLICATION(S)

The present application claims priority to and incorporates by reference the entire contents of Japanese Patent Application No. 2018-147151 filed in Japan on Aug. 3, 2018.

BACKGROUND

The present disclosure relates to an electric motor.

An electric motor disclosed in Japanese Laid-open Patent Publication No. 2010-098832 includes a rotor fixed to a shaft, and a stator disposed at a predetermined interval radially outward of the rotor. The stator includes a stator core in which a plurality of slots is formed in the circumferential direction, and a stator coil inserted into each slot and wound around the stator core. In the electric motor disclosed in Japanese Laid-open Patent Publication No. 2010-098832, an aluminum material is used for a conductor constituting the stator coil. Accordingly, it is said that the weight of the stator coil can be reduced as compared with the case where a copper material is used for the conductor.

A copper material is generally used as a material of the conductor constituting the stator coil. However, in the case where an aluminum material is used for the conductor, a conductivity is less than that in the case where the copper material is used for the conductor if the thickness of the conductors is the same. The resistance value of the stator coil increases accordingly, and the output performance declines. In view of the above, in the case where the aluminum material is used for the conductor, it is necessary to thicken the conductor as compared with the case of using the copper material to obtain the output performance equivalent to that in the case of using the copper material for the conductor. However, when the conductor is thickened, it is necessary to enlarge a slot into which the stator coil is inserted accordingly, which leads to an increase in size of the stator core, and in turn, an increase in size of the electric motor.

SUMMARY

There is a need for providing an electric motor capable of reducing size while reducing weight.

According to an embodiment, an electric motor includes: a rotary shaft member rotating about an axis; a rotor including a rotor core and a magnet, the rotor core having an annular shape and being provided on the rotary shaft member, the magnet being provided on the rotor core; and a stator including a stator core and a stator coil, the stator core having an annular shepe and having a plurality of slots formed in a circumferential direction, the stator core being disposed at an interval in a radial direction that is a direction orthogonal to an axial direction of the rotary shaft member with respect to the rotor core, the stator coil being inserted into the plurality of slots and wound around the stator core. Further, the stator coil includes a first conductor and a second conductor having a conductivity greater than a conductivity of the first conductor, and the second conductor is disposed in the slots.

DETAILED DESCRIPTION

Hereinafter, embodiments of an electric motor according to the present disclosure will be described. Note that the present disclosure is not limited to the present embodiments.

First Embodiment

Figure 1:
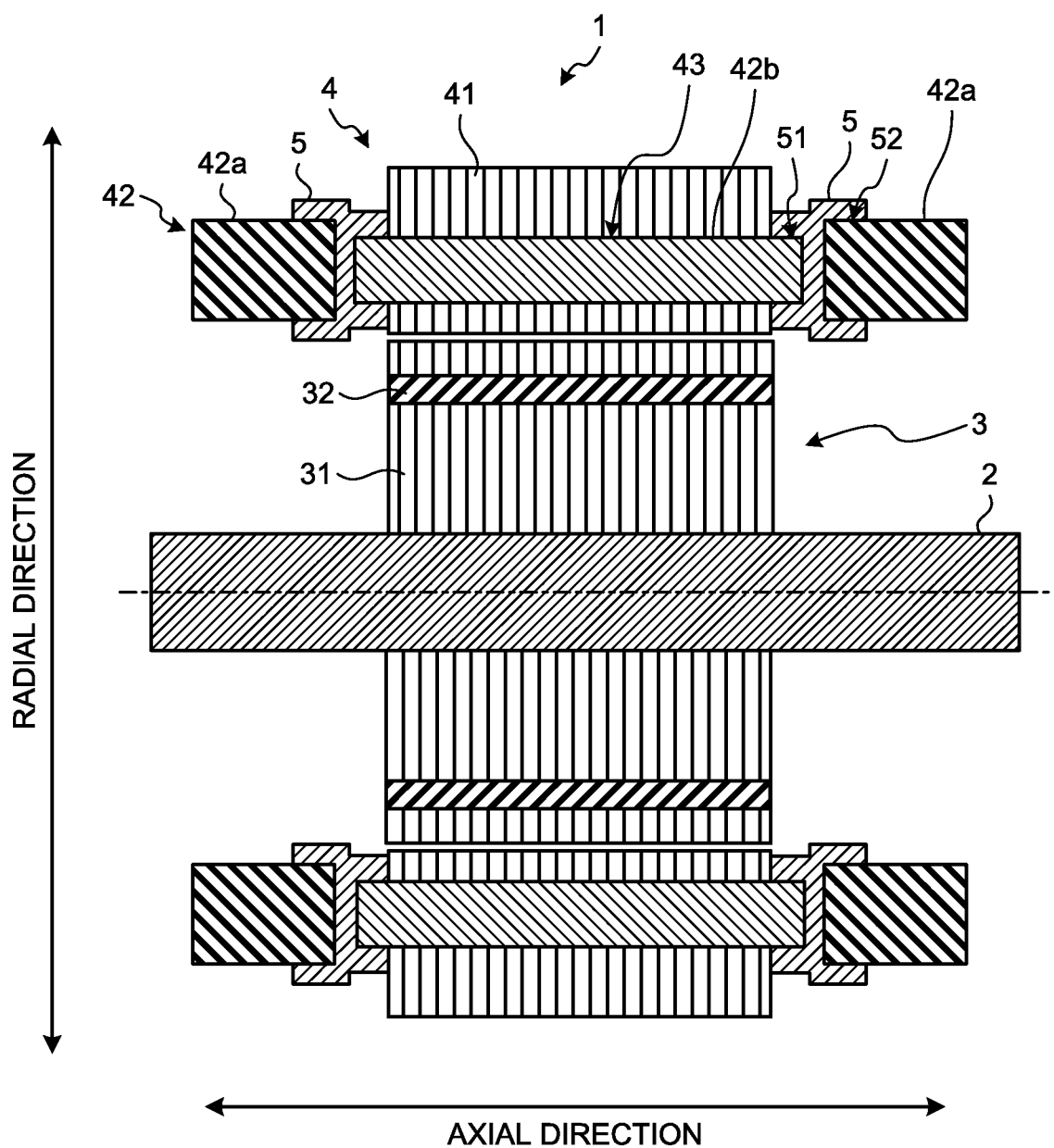
FIG. 1 is a cross-sectional view of an electric motor according to a first embodiment.
Figure 2:
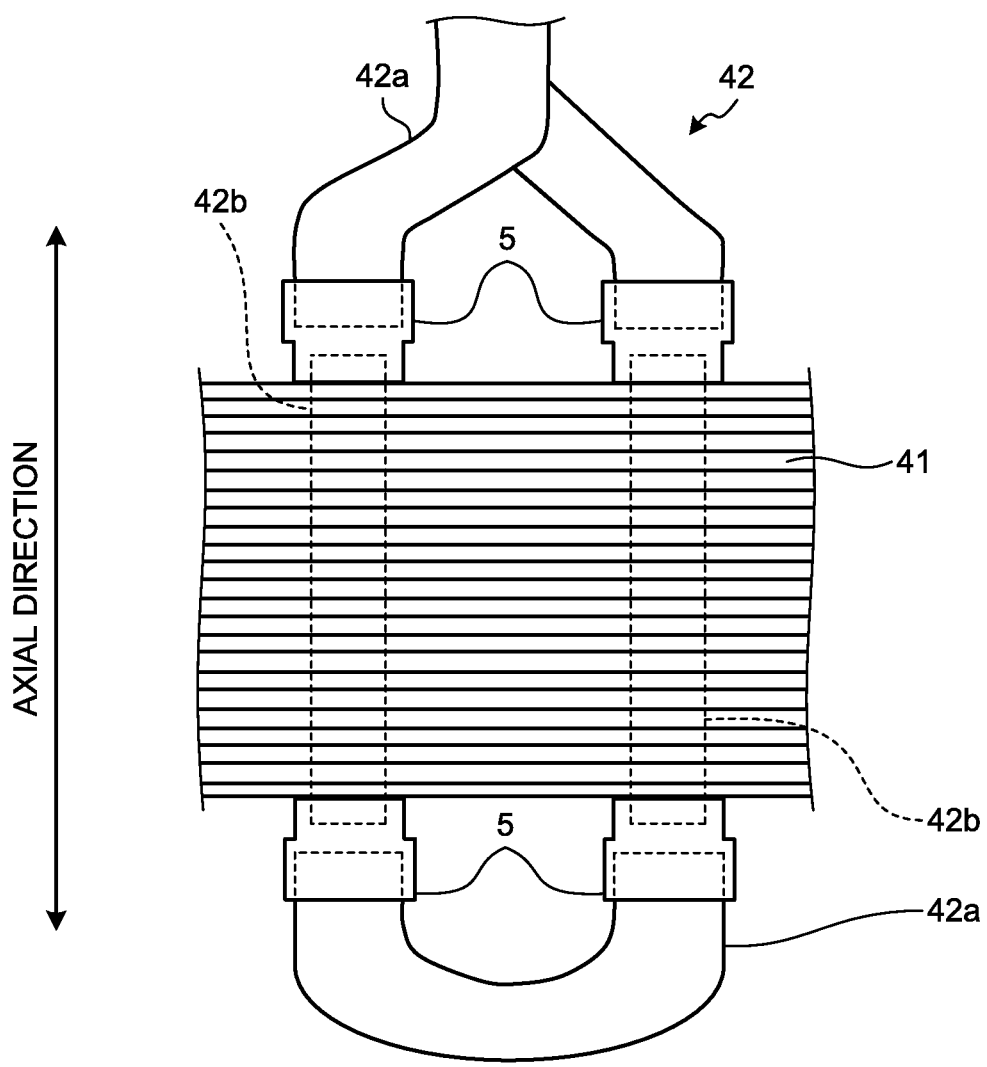
FIG. 2 is a view illustrating a part of a stator viewed from radially outside.
Figure 3:
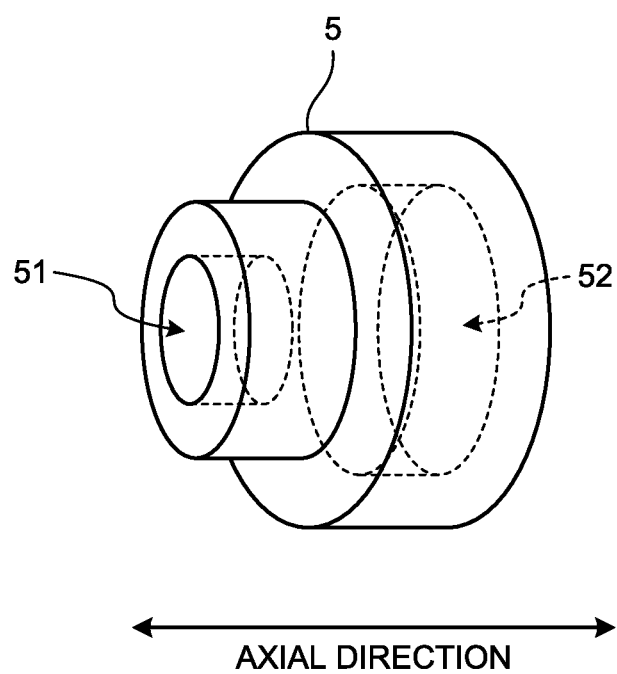
FIG. 3 is a perspective view of a sleeve member.

FIG. 1 is a cross-sectional view of an electric motor 1 according to a first embodiment. FIG. 2 is a view illustrating a part of a stator 4 viewed from radially outside. FIG. 3 is a perspective view of a sleeve member 5. As illustrated in FIG. 1, the electric motor 1 according to the first embodiment includes a shaft 2, a rotor 3, and the stator 4.

The shaft 2 is a metallic rotary shaft member elongated in the axial direction. Note that the "axial direction" in the following descriptions is defined as the axial direction (longitudinal direction) of the shaft 2. The rotor 3 includes a rotor core 31, a magnet 32, and a field core 33. The rotor core 31 is formed in a cylindrical shape by laminating a plurality of electromagnetic steel sheets in the axial direction of the shaft 2. In the rotor core 31, there is a gap between the electromagnetic steel sheets in the axial direction, whereby the magnetoresistance in the axial direction is greater than the magnetoresistance in the circumferential direction and the radial direction which are directions orthogonal to the axial direction of the rotor core 31. Therefore, in the rotor core 31, a magnetic flux hardly flows in the axial direction, and the magnetic flux easily flows in the radial direction and the circumferential direction. The magnet 32 is embedded in the rotor core 31, and extends in the axial direction of the rotor core 31. Both axial end surfaces of the magnet 32 are substantially flush with respective axial end surfaces of the rotor core 31.

The stator 4 is disposed at a predetermined interval radially outward of the rotor core 31, and includes an annular stator core 41 in which a plurality of slots 43 is formed in the circumferential direction, and a stator coil 42 inserted into each slot 43 and wound around the stator core 41. The stator core 41 is formed by laminating a plurality of electromagnetic steel sheets in the axial direction.

The stator coil 42 includes a first conductor (first conductor line) 42a made of an aluminum material, and a second conductor (second conductor line) 42b made of a copper material having conductivity greater than that of the first conductor 42a. In the stator coil 42, the second conductor 42b is disposed in the slots 43.

The stator coil 42 includes the first conductor 42a made of an aluminum material, and the second conductor 42b made of a copper material having a conductivity greater than that of the first conductor 42a. Since the conductivity of the first conductor 42a made of the aluminum material is less than that of the second conductor 42b made of the copper material, the cross-sectional area of the first conductor 42a is made to be greater than the cross-sectional area of the second conductor 42b so that the cross-sectional resistance of the first conductor 42a becomes equal to the cross-sectional resistance of the second conductor 42b. Accordingly, it becomes possible to obtain the output performance equal to that of the case where the stator coil 42 includes only the conductor made of the copper material.

In the electric motor 1 according to the first embodiment, the second conductor 42*b* of the stator coil 42 is disposed in the slot 43. In addition, the first conductor 42*a* of the stator coil 42 is disposed outside the slot 43, and a coil end is formed by the first conductor 42*a*.

In the electric motor 1 according to the first embodiment, the second conductor 42*b* of the stator coil 42 is disposed in the slot 43 of the stator core 41, whereby the size of the slot 43 can be made the same size of the case where the stator coil 42 includes only the conductor made of the copper material. Accordingly, it becomes possible to prevent lowering of the output performance while prevent enlarging the slot 43 as compared with the case where the stator coil 42 includes only the conductor made of the aluminum material. Furthermore, in the electric motor 1 according to the first embodiment, the stator coil 42 includes the first conductor 42*a* made of the aluminum material, and the second conductor 42*b* made of the copper material, whereby the weight of the stator coil 42 can be reduced as compared with the case of the stator coil 42 including only the conductor made of the copper material. Accordingly, the electric motor 1 according to the first embodiment can prevent increasing the size while reducing the weight.

The first conductor 42*a* and the second conductor 42*b* of the stator coil 42 are coupled and electrically connected by the sleeve member (connecting member) 5 made of a copper material or an aluminum material. The sleeve member 5 has a first insertion hole 51 bored from one axial end surface, and a second insertion hole 52 bored from the other axial end surface. Coating for preventing corrosion may be applied to the inner surfaces of the first insertion hole 51 and the second insertion hole 52. Although the first insertion hole 51 and the second insertion hole 52 have respective bottoms in the axial direction and do not communicate with each other, the first insertion hole 51 may be penetrated in the axial direction so that the first insertion hole 51 and the second insertion hole 52 communicate with each other.

The interior diameter of the first insertion hole 51 is slightly less than the diameter of the second conductor 42*b* of the stator coil 42. An end portion of the second conductor 42*b* is press-fitted in the first insertion hole 51 and engaged therewith. The interior diameter of the second insertion hole 52 is slightly less than the diameter of the first conductor 42*a* of the stator coil 42. An end portion of the first conductor 42*a* is press-fitted in the second insertion hole 52 and engaged therewith. In this manner, the stator coil 42 has an assembly structure in which the first conductor 42*a* and the second conductor 42*b* are press-fitted in the first insertion hole 51 and the second insertion hole 52, respectively, from the sides opposite to each other in the axial direction with respect to the sleeve member 5 and are coupled to each other. Accordingly, the first conductor 42*a* and the second conductor 42*b* having different cross-sectional areas can be electrically connected easily using the sleeve member 5.

Moreover, in the electric motor 1 according to the first embodiment, the first conductor 42*a* and the second conductor 42*b* of the stator coil 42 are coupled to each other by the sleeve member 5 in the vicinity of both end surfaces of the stator core 41 in the axial direction. Accordingly, it becomes possible to reduce the amount of use of the second conductor 42*b* made of the copper material in the stator coil 42 as much as possible, and the cost can be reduced.

As a combination of the materials of the first conductor 42*a* and the second conductor 42*b* included in the stator coil 42, for example, an aluminum material may be used for the first conductor 42*a*, and a silver material may be used for the second conductor 42*b*. Meanwhile, when the aluminum material is used for the first conductor 42*a* and the copper material is used for the second conductor 42*b* as a combination of the materials of the first conductor 42*a* and the second conductor 42*b*, the cost of the stator coil 42 can be reduced as compared with other combinations of materials having different conductivity, such as the combination of the aluminum material and the silver material as mentioned above.

In addition, as a method of winding the stator coil 42 around the stator core 41 in the electric motor 1 according to the first embodiment, a segment coil winding method may be used in which, using a plurality of segment conductors of a U-shaped rectangular conductor, each segment conductor is inserted into the slot 43 and then the segment conductors are joined to each other.

Second Embodiment

Next, an electric motor 1 according to a second embodiment of the present disclosure will be described. Note that, in the electric motor 1 according to the second embodiment, descriptions of portions common to those in the electric motor 1 according to the first embodiment will be omitted as appropriate.

Figure 4:
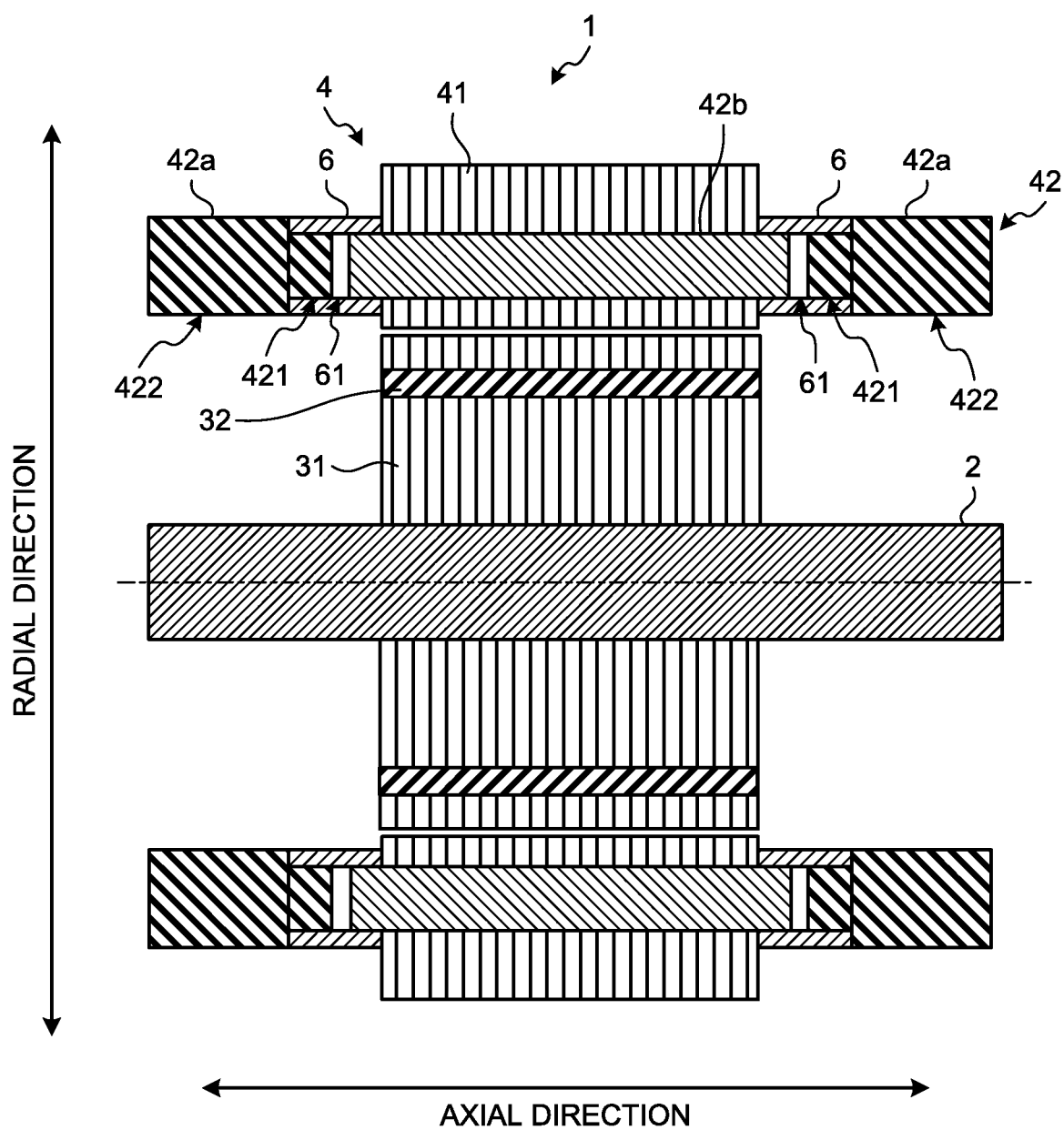
FIG. 4 is a cross-sectional view of an electric motor according to a second embodiment.
Figure 5:
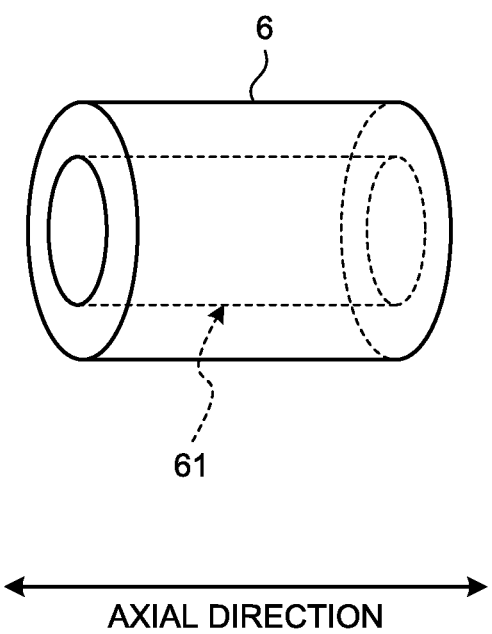
FIG. 5 is a perspective view of a sleeve member.

FIG. 4 is a cross-sectional view of the electric motor 1 according to the second embodiment. FIG. 5 is a perspective view of a sleeve member (contacting member) 6. In the electric motor 1 according to the second embodiment, a first conductor 42*a* made of an aluminum material and a second conductor 42*b* made of a copper material included in a stator coil 42 are coupled to each other by the sleeve member 6 having a through hole 61 penetrating in the same interior diameter in the axial direction. The sleeve member 6 is made of copper or aluminum.

The interior diameter of the through hole 61 of the sleeve member 6 is slightly less than the diameter of the second conductor 42*b* of the stator coil 42. The diameter of the stator coil 42 at an end portion 421 of the first conductor 42*a* is less than the diameter at a portion 422 other than the end portion 421 of the first conductor 42*a*, and is slightly greater than the interior diameter of the through hole 61. The first conductor 42*a* and the second conductor 42*b* are press-fitted in the through hole 61 from opposite sides in the axial direction and are engaged, and the first conductor 42*a* and the second conductor 42*b* are coupled and electrically connected to each other by the sleeve member 6.

In the electric motor 1 according to the second embodiment, since the through hole 61 bored in the sleeve member 6 has the same interior diameter in the axial direction, a workability is improved and the cost can be reduced as compared with the case where two holes having different interior diameters are bored in the sleeve member 6. Furthermore, since the through hole 61 having the same interior diameter is bored in the sleeve member 6 in the axial direction, the external diameter of the sleeve member 6 can be made less than that of the case where two holes having different interior diameters are bored, whereby the size of the sleeve member 6 can be downsized.

In the electric motor according to the present disclosure, for example, the stator coil includes the first conductor made of an aluminum material and the second conductor made of a copper material having conductivity greater than that of the first conductor made of the aluminum material, and the second conductor made of the copper material is disposed in the slots of the stator core. Accordingly, the size of the slot can be set to the size same as that of the case where the stator coil includes only the conductor made of the copper material. It is therefore possible to prevent lowering the output performance while preventing enlarging the slot as compared with the case where the stator coil includes only the conductor made of the aluminum material. As compared with the case where the stator coil includes only the second conductor made of the copper material, the stator coil also includes the first conductor made of the aluminum material in the electric motor according to the present disclosure, whereby the weight of the stator coil can be reduced. The effect similar to that as described above may also be obtained when the stator coil includes the first conductor made of an aluminum material and the second conductor made of a silver material as a combination of the first conductor and the second conductor included in the stator coil. Accordingly, the electric motor according to the present disclosure can prevent increasing the size while reducing the weight.

According to an embodiment, it becomes possible to easily and electrically connect the conductors having different cross-sectional areas.

According to an embodiment, it becomes possible to reduce the cost as compared with the case of combining other conductors having different conductivity.

According to an embodiment, it becomes possible to reduce the amount of use of the second conductor as much as possible.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric motor comprising:
   a rotary shaft member configured to rotate about an axis;
   a rotor including a rotor core and a magnet, the rotor core having an annular shape and being provided on the rotary shaft member, the magnet being provided on the rotor core;
   a stator including a stator core and a stator coil, the stator core having an annular shape and having a plurality of slots formed in a circumferential direction, the stator core being disposed at an interval in a radial direction that is a direction orthogonal to an axial direction of the rotary shaft member with respect to the rotor core, the stator coil being inserted into the plurality of slots and wound around the stator core, wherein
   the stator coil includes a first conductor and a second conductor having a conductivity greater than a conductivity of the first conductor, and
   the second conductor is disposed in the slots; and
   a connecting member, including a first insertion hole for inserting the first conductor and a second insertion hole for inserting the second conductor, configured to electrically connect the first conductor and the second conductor.

2. The electric motor according to claim 1, wherein
   a material of the first conductor is aluminum, and
   a material of the second conductor is copper.

3. The electric motor according to claim 1, wherein the first conductor and the second conductor are connected in a vicinity of each of axial end surfaces of the stator core.

* * * * *